(12) United States Patent
Jung et al.

(10) Patent No.: US 11,603,025 B2
(45) Date of Patent: Mar. 14, 2023

(54) VACUUM INSULATOR IN A STOREHOUSE AND METHODS OF MAKING AND USING THE SAME

(71) Applicant: LG ELECTRONICS INC., Seoul (KR)

(72) Inventors: Wonyeong Jung, Seoul (KR); Myoungju Kang, Seoul (KR); Deokhyun Youn, Seoul (KR); Sungsub Lee, Seoul (KR); Sora Kim, Seoul (KR); Daewoong Kim, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 17/123,225

(22) Filed: Dec. 16, 2020

(65) Prior Publication Data
US 2021/0101513 A1    Apr. 8, 2021

Related U.S. Application Data

(62) Division of application No. 15/780,837, filed as application No. PCT/KR2016/014306 on Dec. 7, 2016, now Pat. No. 10,899,264.

(30) Foreign Application Priority Data

Dec. 15, 2015    (KR) ........................ 10-2015-0179480

(51) Int. Cl.
*B60N 3/10*    (2006.01)
*B60R 7/04*    (2006.01)
(Continued)

(52) U.S. Cl.
CPC ................ *B60N 3/104* (2013.01); *B60R 7/04* (2013.01); *F25B 21/02* (2013.01); *F25B 21/04* (2013.01);
(Continued)

(58) Field of Classification Search
CPC .......... B60N 3/104; F25B 21/02; F25B 21/04; F25B 2321/023; F25B 2321/025;
(Continued)

(56) References Cited

U.S. PATENT DOCUMENTS 3,823,567 A    7/1974   Corini
4,759,190 A    7/1988   Trachtenberg
(Continued)

FOREIGN PATENT DOCUMENTS

CA        2159620       8/1995
CN        102320424    1/2012
(Continued)

OTHER PUBLICATIONS

Korean Office Action dated Jan. 4, 2021 issued in Application 10-2017-0093792.
(Continued)

*Primary Examiner* — Gregory A Blankenship
(74) *Attorney, Agent, or Firm* — Ked & Associates LLP

(57) ABSTRACT

A vacuum insulator including a heat diffusion block placed in a vacuum space; a thermoelectric module, in the vacuum space, coming into contact with the heat diffusion block so as to exchange heat therewith: and a heat sink exchanging heat with the thermoelectric module and placed in a first space or a second place. High heat-insulation performance and heat-transfer performance can be obtained.

20 Claims, 16 Drawing Sheets

(51) Int. Cl.
    *F25B 21/04*     (2006.01)
    *F25D 19/00*     (2006.01)
    *F25D 23/08*     (2006.01)
    *F25D 23/02*     (2006.01)
    *F25D 23/06*     (2006.01)
    *F25B 21/02*     (2006.01)

(52) U.S. Cl.
    CPC ........... *F25D 19/00* (2013.01); *F25D 19/006* (2013.01); *F25D 23/02* (2013.01); *F25D 23/06* (2013.01); *F25D 23/065* (2013.01); *F25D 23/08* (2013.01); *F25B 2321/023* (2013.01); *F25B 2321/025* (2013.01); *F25D 2201/14* (2013.01)

(58) Field of Classification Search
    CPC ........ F25D 19/00; F25D 19/006; F25D 23/02; F25D 23/06; F25D 23/065; F25D 23/08; F25D 2201/14; B60R 7/04
    See application file for complete search history.

(56) References Cited

U.S. PATENT DOCUMENTS

| | | | |
|---|---|---|---|
| 5,398,510 | A | 3/1995 | Gilley |
| 5,505,046 | A | 4/1996 | Nelson et al. |
| 5,550,046 | A | 4/1996 | Nelson |
| 5,638,896 | A | 6/1997 | Nishino et al. |
| 5,851,458 | A | 12/1998 | De Vos |
| 6,260,360 | B1 | 7/2001 | Wheeler |
| 6,334,311 | B1 | 1/2002 | Kim |
| 10,759,302 | B2 * | 9/2020 | Qiu .................. B60L 58/13 |
| 10,899,264 | B2 * | 1/2021 | Jung .................. F25D 23/065 |
| 11,035,604 | B2 * | 6/2021 | Kim .................. F25D 23/003 |
| 11,148,574 | B2 * | 10/2021 | Kim .................. F25D 19/00 |
| 11,260,727 | B2 * | 3/2022 | Ki .................. B60N 3/104 |
| 11,358,531 | B2 * | 6/2022 | Heinz .................. B60R 7/04 |
| 11,400,847 | B2 * | 8/2022 | Nam .................. B60N 3/104 |
| 2006/0000221 | A1 | 1/2006 | Culp |
| 2007/0068173 | A1 | 3/2007 | Sauciuc et al. |
| 2007/0093102 | A1 | 4/2007 | Park et al. |
| 2007/0283709 | A1 | 12/2007 | Luse |
| 2008/0006436 | A1 | 1/2008 | Sun |
| 2014/0315011 | A1 | 10/2014 | Lee et al. |
| 2014/0318591 | A1 | 10/2014 | Shelby |
| 2015/0107269 | A1 | 4/2015 | Oh |
| 2015/0183377 | A1 | 7/2015 | Ruffner |
| 2016/0243000 | A1 | 8/2016 | Gray |
| 2017/0056289 | A1 | 3/2017 | Tsuno |
| 2017/0108269 | A1 | 4/2017 | Shin |
| 2018/0224198 | A1 | 8/2018 | Jung |
| 2018/0231298 | A1 | 8/2018 | Jung |
| 2018/0231300 | A1 | 8/2018 | Jung |
| 2018/0238486 | A1 | 8/2018 | Jung |
| 2018/0356147 | A1 | 12/2018 | Jung |
| 2019/0255980 | A1 | 8/2019 | Jung |
| 2019/0381856 | A1 | 12/2019 | Bae |
| 2019/0381923 | A1 | 12/2019 | Kim |
| 2020/0013011 | A1 | 1/2020 | Kashi |
| 2020/0023763 | A1 | 1/2020 | Lee |
| 2020/0031265 | A1 | 1/2020 | Jung |
| 2020/0075830 | A1 | 3/2020 | Spillner |
| 2020/0080752 | A1 | 3/2020 | Cho |
| 2020/0187437 | A1 | 6/2020 | Zhou |
| 2020/0191451 | A1 | 6/2020 | Hiemeyer |
| 2020/0223344 | A1 * | 7/2020 | Kang .................. B60H 1/3227 |
| 2020/0269658 | A1 * | 8/2020 | Ki .................. F25D 29/00 |
| 2020/0317108 | A1 * | 10/2020 | Wu .................. F25D 23/003 |
| 2020/0361690 | A1 * | 11/2020 | Sanders .................. B65D 81/18 |
| 2020/0373638 | A1 * | 11/2020 | Lee .................. H01M 10/6572 |
| 2021/0356180 | A1 * | 11/2021 | Miozza .................. H05K 7/20136 |
| 2021/0387557 | A1 * | 12/2021 | Himmelreich .......... F25B 21/02 |

FOREIGN PATENT DOCUMENTS

| | | |
|---|---|---|
| DE | 3619176 | 12/1987 |
| EP | 0 860 669 | 8/1998 |
| JP | H 08-121929 | 5/1996 |
| JP | 09243244 | 9/1997 |
| JP | 2002-031456 | 1/2002 |
| JP | 2003-202183 | 7/2003 |
| JP | 2004-224236 | 8/2004 |
| KR | 10-2004-0094662 A | 11/2004 |
| KR | 10-2007-0043446 | 4/2007 |
| KR | 10-2007-0043446 A | 4/2007 |
| KR | 10-1210148 | 12/2012 |
| KR | 10-2013-0048528 A | 5/2013 |
| KR | 10-2013-0057619 A | 6/2013 |
| RU | 2 054 608 | 2/1996 |
| RU | 2002119744 | 3/2004 |
| RU | 2535502 | 12/2014 |
| WO | WO 95/21361 A1 | 8/1995 |
| WO | WO 03/019093 | 3/2003 |

OTHER PUBLICATIONS

International Search Report dated Apr. 11, 2017 issued in Application No. PCT/KR2016/014306.
Australian Office Action dated Jun. 13, 2019 issued in Application No. 2016373207.
European Search Report dated Jul. 18, 2019 issued in Application No. 16875972.8.
Russian Office Action dated Aug. 21, 2019 issued in Application No. 2018125452.
Chinese Office Action dated Dec. 4, 2019 issued in Application No. 201680073761.7 (English translation attached).
Russian Notice of Allowance dated May 25, 2020 issued in Application No. 2020106717/12 (English translation attached).
U.S. Office Action dated Jul. 6, 2020 issued in parent U.S. Appl. No. 15/780,837.
Russian Office Action dated Sep. 28, 2021 issued in RU Application No. 2020127091.
European Office Action dated Jun. 28, 2022 issued in Application 16 875 972.8.

\* cited by examiner

FIG. 10

| Group | | General plastic | | | | Engineering plastic | | | |
|---|---|---|---|---|---|---|---|---|---|
| Meaterial | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa-m-k/W | 79 | 460 | 689 | 448 | 189 | 357 | 420 | 552 |
| Heat Deflection Temp at 264 psi | °C | 80 | 132 | 146 | 125 | 126 | 121 | 105 ~ 260 | 160 |
| Max Operating Temperature | °C | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

FIG. 14
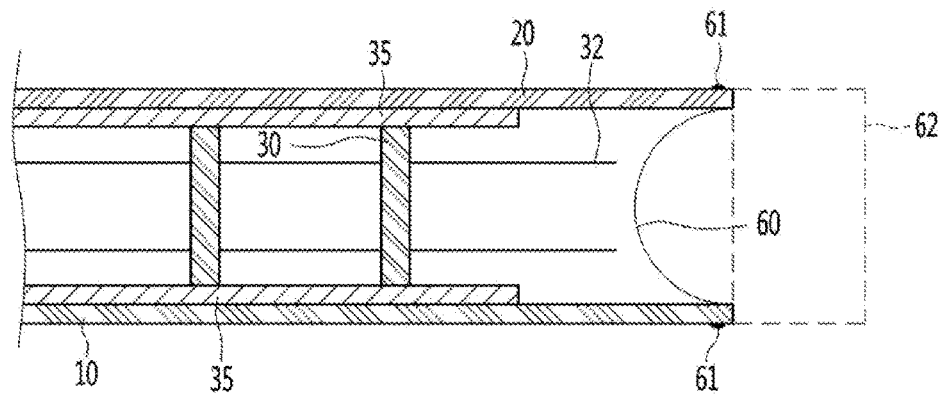
(a)
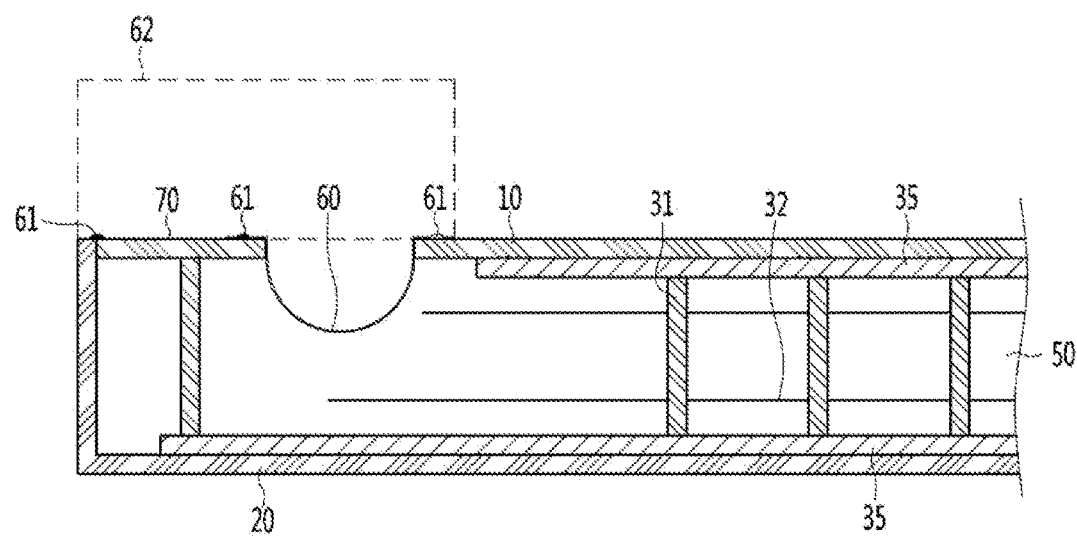
(b)

VACUUM INSULATOR IN A STOREHOUSE AND METHODS OF MAKING AND USING THE SAME

CROSS-REFERENCE TO RELATED APPLICATIONS

This application is a Divisional Application of U.S. patent application Ser. No. 15/780,837 filed Sep. 18, 2018, which is a U.S. National Stage Application under 35 U.S.C. § 371 of PCT Application No. PCT/KR2016/014306, filed Dec. 7, 2016, which claims priority to Korean Patent Application No. 10-2015-0179480, filed Dec. 15, 2015, whose entire disclosures are hereby incorporated by reference.

BACKGROUND

1. Field

The present disclosure relates to a vacuum insulator, a storehouse, a vehicle storehouse, and a vehicle. For example, the present disclosure relates to a vacuum insulator to assist with storing food at a desired temperature in a storehouse, a vehicle storehouse, and a vehicle.

2. Background

In some cases, a vehicle is equipped with a storehouse to store beverage cans or a small amount of food. The storehouse may be installed in an internal space such as an armrest so that a driver may conveniently consume the beverage or food. When a storehouse is installed in a luxury vehicle, an image of the vehicle may be enhanced, and user's convenience may be improved.

When the storehouse installed in the vehicle uses an existing air conditioning system installed in the vehicle, it may be difficult to allow the storehouse to reach a desired temperature, or time taken to reach a target temperature may be excessively long. In consideration of this limitation, a device using a thermoelectric module (TEM) has been introduced in recent years.

The thermoelectric module refers to a semiconductor mechanism that performs cooling or heating by using a thermoelectric effect. The thermoelectric effect provides reversible and direct energy conversion between heat and electricity. The thermoelectric effect results from movement of charge carriers within a material, i.e., electrons and holes.

The thermoelectric effect may be divided into a Seebeck effect and a Peltier effect.

The Seebeck effect is an effect in which a temperature difference is directly converted to electricity. Thus, the Seebeck effect may be applied to a power generation field by using electromotive force generated due to a difference in temperature between ends of the thermoelectric material. The Peltier effect is a phenomenon in which heat is generated at an upper junction and is absorbed at a lower junction when current flows to a circuit. Thus, the Peltier effect may be applied to cooling fields by using a difference in temperature, at both ends, generated by current applied from the outside. The Seebeck effect and the Peltier effect are different from joule heating in that the Seebeck effect and the Peltier effect are thermodynamically reversible.

There has been introduced a device that is fixedly mounted in a vehicle that uses the above-described thermoelectric effect. The device stores food and uses current of a vehicle cigar jack. However, these devices use a heat insulating material, which is exemplified by foaming urethane, for heat insulation. Thus, there is a limitation that a thick heat insulating wall is used. Sufficient heat insulating performance may not be obtained even if the thick heat insulating wall is used.

To solve the above-described problem, a structure has been provided for providing a heat insulating wall to be in a vacuum state. For example, a technique having a feature in which a surface area of an enclosure is five times an area of a heat transfer surface (provided on a thermoelectric module) in "a heat insulating box body provided with the thermoelectric module" is disclosed in Japanese Patent Publication No. JP2003202183. Also, a structure in which a vacuum heat insulating material is provided between an outer case and an inner case is disclosed. Polystyrene is exemplified as a material having low thermal conductivity in the cited document.

However, according to the above-described related art, sufficient vacuum may not be obtained. Thus, there is a problem that sufficient heat insulating effect is not obtained. Also, since it is difficult to improve the performance of the thermoelectric module, a large cooling effect may not be obtained when compared to the consumed electric energy.

BRIEF DESCRIPTION OF THE DRAWINGS

The embodiments will be described in detail with reference to the following drawings in which like reference numerals refer to like elements wherein:

FIG. 10 is a diagram for describing results obtained by examining resins used for manufacturing a supporting unit.

FIG. 14 is a view illustrating various embodiments of conductive resistance sheets and peripheral portions thereof.

DETAILED DESCRIPTION

Figure 1:
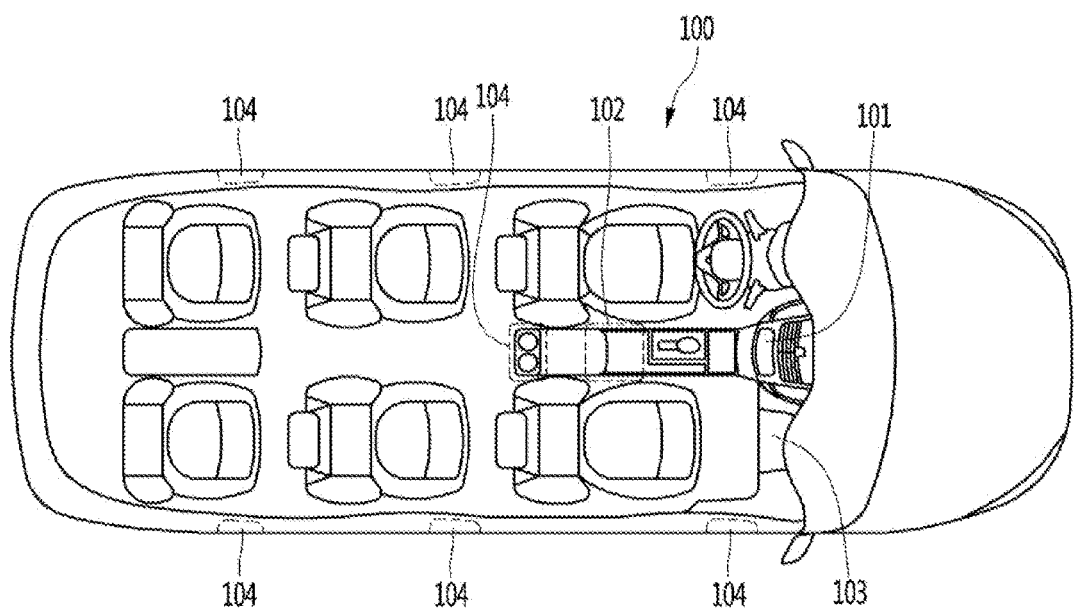
FIG. 1 is a plan view of a vehicle according to an embodiment.

FIG. 1 is a plan view of a vehicle according to an embodiment.

One or more storehouses may be provided in a vehicle 100 according to an embodiment. For example, the storehouse may be at least one of a console box storehouse 101 mainly used by a driver, an armrest storehouse 102 provided in an armrest mainly used by the driver or an assistant driver, a glove box storehouse 103 provided in a glove box mainly used by the assistant driver, a passenger side storehouse 104 mainly used by a passenger in the rear seat, and a door side storehouse 104 provided in a door of the vehicle. The storehouses 101, 102, 103, and 104 may perform a function of at least one of cold storage and warm storage or a function of cooling and heating a cabinet.

Hereinafter, according to embodiments, cold storage will be mainly described. However, it may be understood and it is appreciated that a description relating to cold storage or warm storage may refer to cold storage, warm storage, and cold and warm storage.

The storehouse may perform the function of the cold storage/warm storage by using a thermoelectric module.

Figure 2:
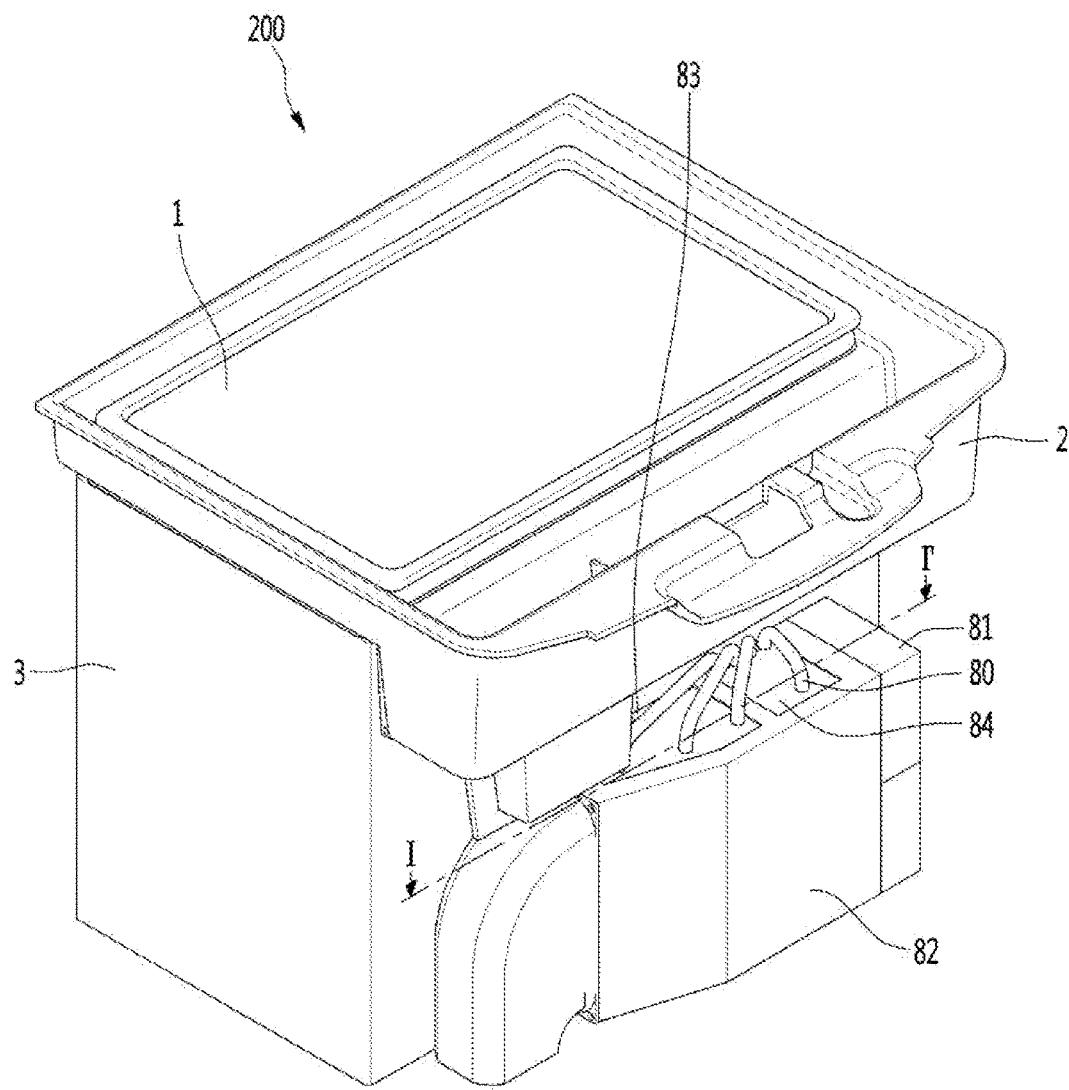
FIG. 2 is a view of a storehouse for a vehicle according to an embodiment.

FIG. 2 is a view of a storehouse for the vehicle according to an embodiment.

Referring to FIG. 2, the storehouse 200 for the vehicle includes a main body 3 having a space in which articles are stored and at least an external opening. A door 1 is provided for a user to open and close the opening of the main body 3. A fitting part or fitting 2 is provided for accurately positioning the main body when the main body is mounted in the vehicle.

The fitting part 2 affords at least one of the main body 3 and the door 1 to match or mate with the vehicle. Thus, corresponding portions, when the storehouse 200 for the vehicle and the vehicle 100 are assembled, may be stably maintained in operation without being separated from each other, even though impact and vibration may be applied during operation of the vehicle. The fitting part 2 may buffer the vibration and impact to reduce an adverse affect to the storehouse 200 for the vehicle.

When the storehouse 200 for the vehicle is not mounted in a vehicle and is used separate from the vehicle, the fitting part 2 may not be provided. In this case, the storehouse 200 for the vehicle may also be called a storehouse. Hereinafter, if called the storehouse without a specific designation, such may be understood as including the storehouse for the vehicle.

A heatsink 83 may be provided for absorbing heat from an outer surface of the second plate member or second plate 20. The heatsink 83 provides an outer surface of the storehouse and may be provided on any one surface of the main body 3. The heatsink 83 may promote heat exchange. The heat absorbed by the heatsink 83 may be discharged to the outside by a heat pipe 80 that quickly transfers heat of the heatsink 83, to the outside. A fin 84 may convectively cool the heat rapidly. A duct 82 separates a space, in which the fin 84 is provided, from the outside. A fan 81 allows air to flow to the duct 82.

The heatsink 83, the heat pipe 80, the fin 84, the duct 82, and the fan 81 may be provided in an external environment different from an internal environment of the storehouse. Thus, the heat or cold air may be quickly released from the internal environment to the external environment.

Figure 3:
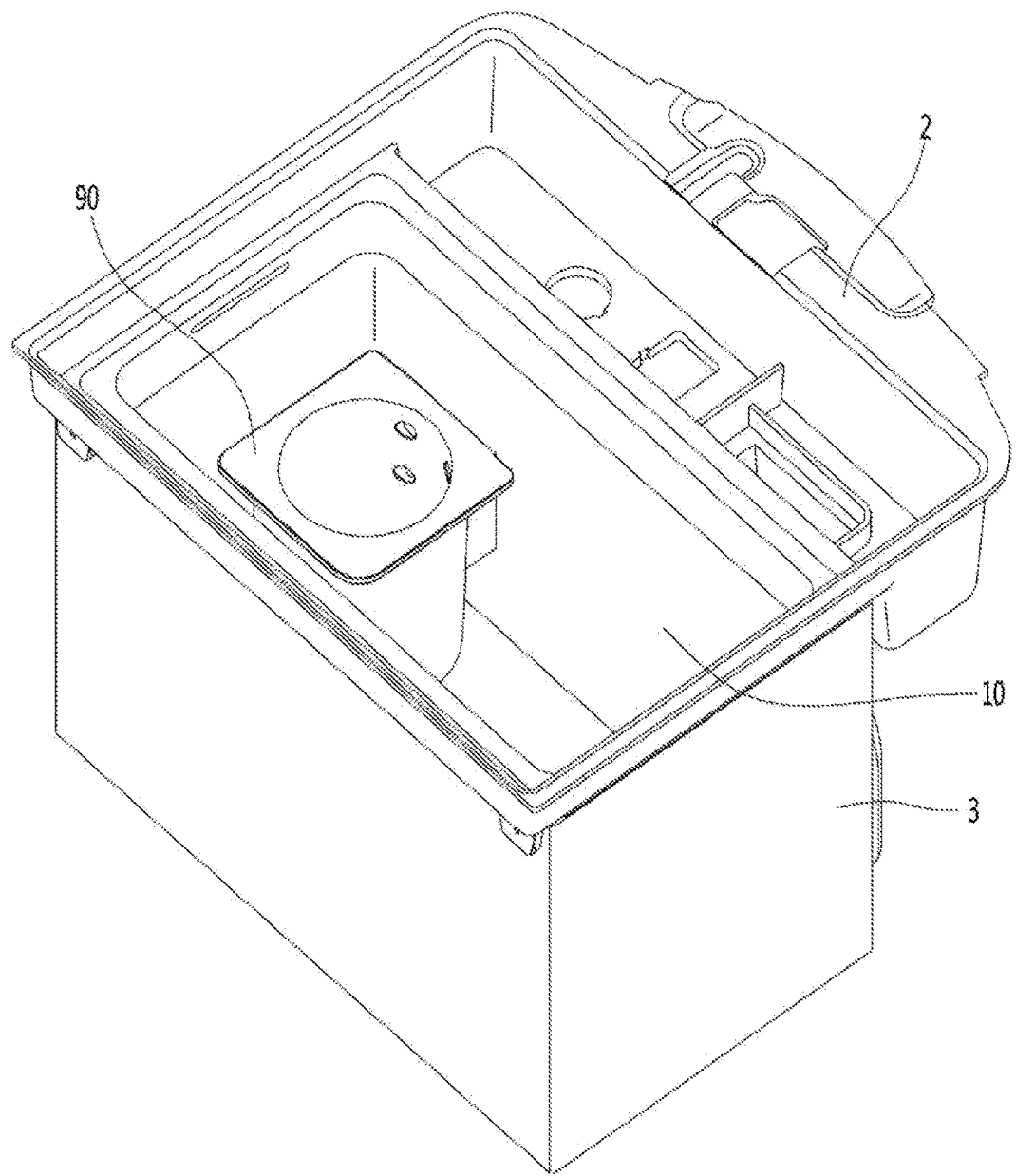
FIG. 3 is a top perspective view of the storehouse in a state in which a door is removed according to an embodiment.

FIG. 3 is a top perspective view of the storehouse in a state in which the door is removed.

Referring to FIG. 3, a holder 90 may be provided in an internal space of the storehouse 200. An item for containing water or beverage, such as a water bottle or a beverage can, may be provided on or in the holder 90. The holder may come into contact with the first plate member or first plate 10 of the storehouse to allow cold air to be quickly transferred from the first plate member 10. Since the holder 90 is made of a material having high thermal conductivity, such as aluminum, the transfer of cold air to the item containing water or beverage may be quickly performed.

Figure 4:
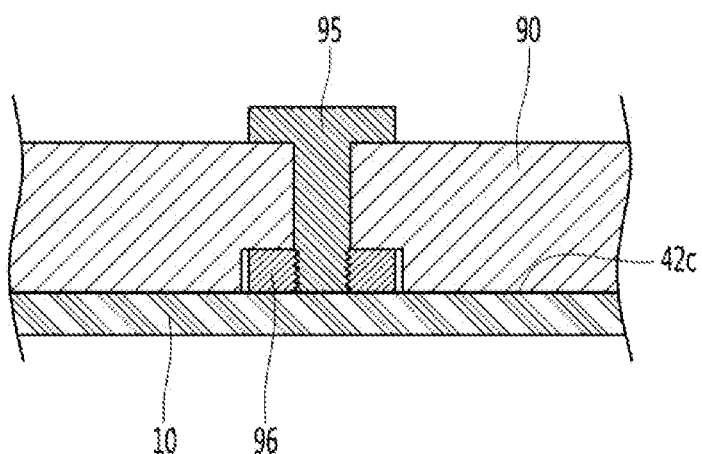
FIG. 4 is a cross-sectional view of a portion of a storehouse where a holder and the storehouse come into contact with each other according to an embodiment.

FIG. 4 is a cross-sectional view of a portion of the storehouse at which a holder and the storehouse come into contact with each other.

Referring to FIG. 4, the first plate member 10 and the holder 90 may come into contact with each other. In order to improve the thermal conductivity of the heat passing through the contact surface or area between the first plate member 10 and the holder 90, the first plate member 10 and the holder 90 may be pressed or clamped so as to be coupled to each other. A thermal interface module (TIM) may be inserted into the contact surface or area between the first plate member 10 and the holder 90 to better promote heat conduction.

In order to provide such a press coupling, a nut 96 may be coupled to an inner surface of the first plate member 10. The nut 96 may be coupled to the first plate member 10 through welding. In an installation position of the holder 90, a hole having an expanded head part may be provided at a position corresponding to the nut 96, and a bolt 95 inserted into the hole. The bolt 95 may be coupled to the nut 96 to maintain a press coupling between the first plate member 10 and the holder 90.

Figure 5:
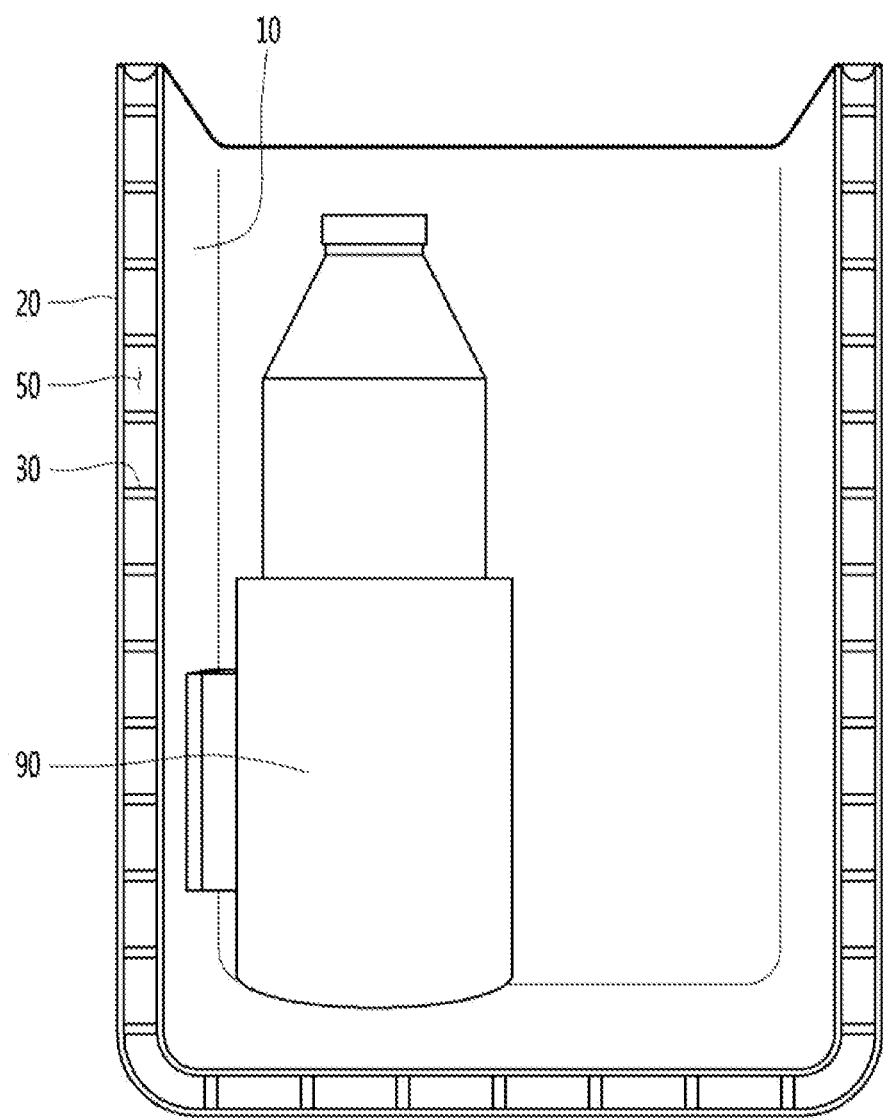
FIG. 5 is a cross-sectional view of the storehouse according to an embodiment.

FIG. 5 is a cross-sectional view of the storehouse.

Referring to FIG. 5, in the storehouse according to an embodiment, cold air may be quickly transferred from the first plate member 10 through the holder 90 via conduction process. Thus, the user may quickly cool food. Since a thermoelectric module 40 is coupled to a side surface of the first plate member 10, to which the holder 90 is coupled, the water or beverage may be cooled more quickly.

A second plate member 20 provides an outer surface of the storehouse 20. A supporting unit or structure 30 maintains vacuum pressure of a space between the first plate member 10 and the second plate member 10. This will be described later in more detail.

Figure 6:
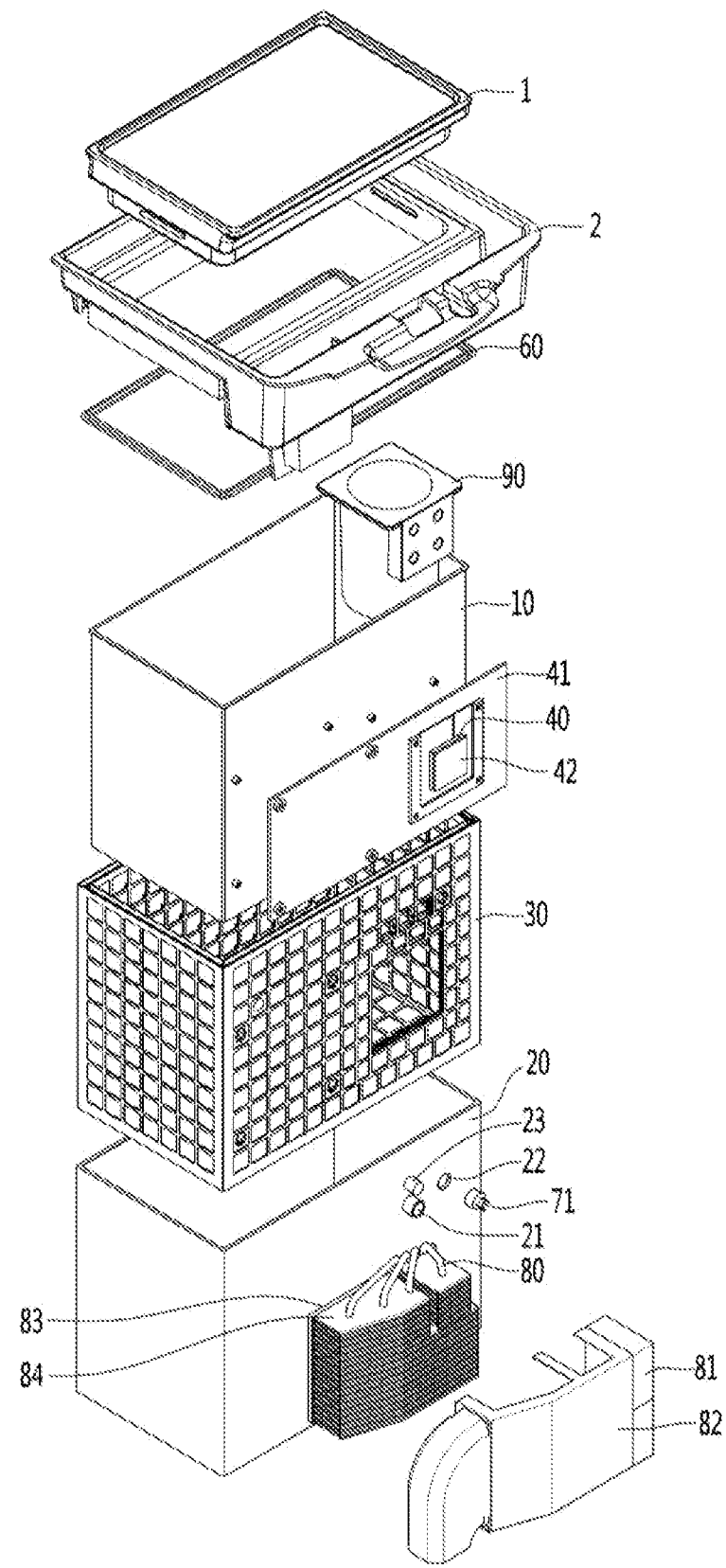
FIG. 6 is an exploded perspective view of the storehouse for the vehicle according to an embodiment.

FIG. 6 is an exploded perspective view of the storehouse for the vehicle.

Referring to FIG. 6, each of the main body 3 and the door 1 may be provided as or with a vacuum insulator. The vacuum insulator may include the first plate member 10 for providing the wall of a low-temperature space, the second plate member 20 for providing the wall of a high-temperature space, and a vacuum space 50 defined as a spacing between the first and second plate members 10 and 20. The vacuum insulator may include a conductive resistance sheet 60 for preventing heat conduction between the first and second plate members 10 and 20.

The conductive resistance sheet 60 serves as a heat resistance unit or element that resists the heat transfer between the plate members. The heat resistance unit or element may include the conductive resistance sheet and refer to a unit that is capable of resisting heat transfer (where the heat transfer may include conduction, convection, and radiation) between the plate members.

In the storehouse, the first plate member 10 may be called an inner case, and the second plate member 20 may be called an outer case. An exhaust port 21 for exhausting air from the vacuum space part or vacuum space 50, to create a vacuum state, may be provided on the second plate member 20. A getter port 23 in which a getter is provided, to maintain the vacuum state, may be provided on the second plate member 20. The getter may be provided in the getter port 23 to improve a degree or level of vacuum after the exhaust is completed and also to maintain a high degree of vacuum for a long or extended time. A power source hole 22, through which power is supplied to the thermoelectric module 40 provided in the vacuum space 50, may be provided in the second plate member 20.

The first plate member 10 may define at least one portion of a wall that defines the first space. The second plate member 20 may define at least one portion of a wall that defines the second space. The first space and the second space may have different temperatures. Here, the wall for each space may serve as not only a wall directly contacting the space but also a wall not contacting or opposing the space. For example, a vacuum insulator of an embodiment may be applied that has a separate wall contacting each space.

Due to characteristics of the storehouse for the vehicle, which is often opened, closed and has many impacts, the door 1 may have a heat insulating structure made of a foaming resin, with a vacuum insulator, to prevent malfunction. In order to maximize cooling effect and to provide high heat insulating performance, the vacuum insulator may be applied to the door.

The sealing terminal 71 may be welded to the power source hole 22 to maintain sealing of the vacuum space 50. A wire within the vacuum space 50 may be connected to an inner portion of a terminal provided on the sealing terminal. A wire from outside may be connected to an outer portion of the terminal, provided on the sealing terminal, to maintain power supply.

The supporting unit 30 may be provided to reduce deformation or maintain a volume of the vacuum space 50. The supporting unit 30 may include a bar 31. The bar 31 may extend in a substantially vertical direction, with respect to the plate members, between the first plate member and the second plate member. A support plate 35 may be additionally provided on at least any one end of the bar 31. The support plate 35 may connect at least two or more bars 31 to each other and extend in a horizontal direction with respect to the first and second plate members 10 and 20.

The heat diffusion block 41 may be provided in contact with an outer surface of the first plate member 10. The inner surface of the thermoelectric module 40 may be provided in contact with an outer surface of the heat diffusion block 41. An inner surface of the second plate member 20 may be provided in contact with the outer surface of the thermoelectric module.

The thermal interface module may be intervened into or provided between contact surfaces of components to provide quick heat conduction. When the storehouse is used as a refrigerator, the thermoelectric module 40 may absorb heat from the heat diffusion block 41 and release heat to the second plate member 20. In such arrangement, in order to quickly transfer heat using heat conduction, the thermal interface module may be intervened into each of the contact surfaces.

Figure 7:
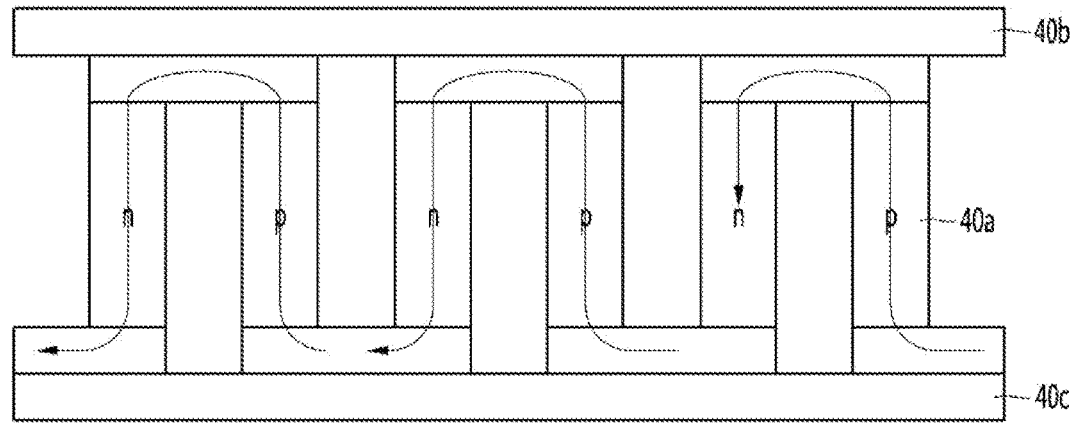
FIG. 7 is a diagram for describing a function of a thermoelectric module according to an embodiment.

FIG. 7 is a diagram for describing function of the thermoelectric module. Referring to FIG. 7, the thermoelectric module has a structure in which semiconductors 40a having different polarities are connected in series to each other. A first temperature part 40c may be provided on any one surface of the thermoelectric module 40, and a second temperature part 40b may be provided on another surface of the thermoelectric module 40, according to a flow direction of current.

The first temperature part 40c and the second temperature part 40b may come into contact with the outer surface of the heat diffusion block 41 and the inner surface of the first plate member 20, respectively.

Figure 8:
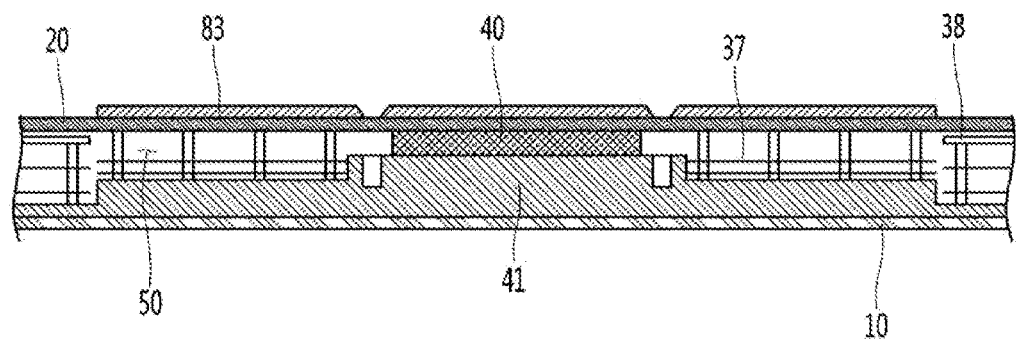
FIG. 8 is a schematic cross-sectional view of a surface of the storehouse in which a thermoelectric module is provided according to an embodiment.

FIG. 8 is a schematic cross-sectional view of a surface of the storehouse on which the thermoelectric module is provided.

Referring to FIG. 8, the supporting unit 30, the heat diffusion block, and the thermoelectric module 40 may be provided in an internal space of the vacuum space 50. The heat diffusion block 41 may come into contact with the outer surface of the first plate member 10. The inner surface of the thermoelectric module 40 may come into contact with the outside of the heat diffusion block 41. The outer surface of the thermoelectric module 40 may come into contact with the inner surface of the second plate member 20. The heat diffusion block 41 may perform heat conduction to a wide area of the first plate member 10. On the other hand, the heat diffusion block 41 may perform heat conduction to a narrow or small area that is together or in contact with the thermoelectric module 40. Thus, with respect to an action of the thermoelectric module 40, the heat diffusion block 41 may be a passive heat transfer member and thus not act as a resistor to heat conduction.

According to the above-described structure, the heat diffusion block 41 may absorb heat across a wide area of the first plate member 10, and the absorbed heat may be transferred to the second plate member 20 by passing through the thermoelectric member 40. The heatsink 83 may come into contact with the outer surface of the second plate member 20 to absorb heat from the second plate member 20. The heatsink 83 may have a contact area, to the second plate member 20, greater than that of the thermoelectric module 40. Thus, the second plate member 20 may be quickly cooled.

The supporting unit 30 may include a first supporting unit 37 provided on a portion on or at which the thermoelectric module 40 and the heat diffusion block 41 are provided; and a second supporting unit 38 provided on a remaining portion facing the plate members 10 and 20.

The first supporting unit 37 may have a height less than that of the second supporting unit 38. This is done for providing sufficient strength with respect to the portion on which the thermoelectric module 41 and the heat diffusion block 41 are provided, so as to prevent the plate members 10 and 20 from being deformed by vacuum pressure.

A support unit may not be provided, where the thermoelectric module 40 may come or comes into direct surface contact with the second plate member 20. Such contact area may serve to improve contact reliability between the thermoelectric module 40 and the second plate member 20. That is to say, in order to improve the thermal conductivity on both surfaces of the thermoelectric module 40, the contact surface between the thermoelectric module 40 and the second plate member 20 and the contact surface between the thermoelectric module 40 and the heat diffusion block 41 may be pressed by using vacuum pressure, of the vacuum space 50, without a separate pressing or clamp structure. For this, the degree of vacuum of the vacuum space 50 may be maintained at a considerable high level.

In the first supporting unit 37, a distance between the bars 31 may be adjusted in consideration of the support operation of the second plate member 20 and the pressing operation on both surfaces of the thermoelectric module 40. For example, a distance between an edge of the thermoelectric module 40 and the bar 31, that is the closest to the edge may be 1.1 times to 3 times greater than a distance between the bars. Thus, high reliability with respect to the pressing operation on both the surfaces of the thermoelectric module 40 may be provided.

The supporting unit will be described in more detail.

Figure 9:
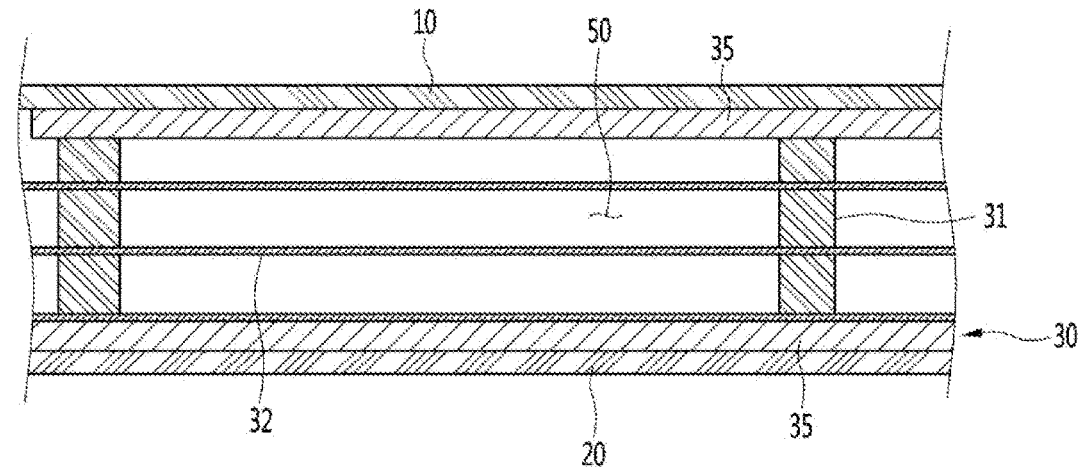
FIG. 9 is a view illustrating the inside of a vacuum space part according to an embodiment.

FIG. 9 is a view illustrating the inside of a vacuum space.

Referring to FIG. 9, the vacuum space 50 may include or be constituted by a third space having a pressure different from that of each of the first and second spaces, preferably a vacuum state, thereby reducing adiabatic loss. The third space may be provided at a temperature between the temperature of the first space and the temperature of the second space. The third space may be provided in a vacuum state. Thus, the first plate member 10 and the second plate member 20 may be subjected to force through which the first plate member 10 and the second plate member 20 are contracted, in a direction in which the first plate member 10 and the second plate member 20 approach each other, by force equivalent to a pressure difference between the spaces. As a result, the vacuum space 50 may be deformed in a direction in which the vacuum space 50 decreases in volume. With this arrangement, an adiabatic loss may be caused due to an increase in amount of heat radiation, caused by the contraction of the vacuum space 50, and an increase in amount of heat conduction, caused by contact between the plate members 10 and 20.

The supporting unit 30 may provide structure to reduce deformation of the vacuum space 50. The supporting unit 30 may include bars 31. Each bar 31 may extend in a substantially vertical direction with respect to the plate members to support a distance or area between the first plate member and the second plate member.

A support plate 35 may be provided on at least any one end of the bars 31. The support plate 35 may connect at least two or more bars 31 to each other and extend in a substantially horizontal direction with respect to the first and second plate members 10 and 20. The support plate 35 may be provided in a plate shape or may be provided in a lattice shape so that an area of the support plate contacting the first or second plate member 10 or 20 decreases so as to reduce heat transfer.

The bars 31 and the support plate 35 may be fixed to each other at at least one portion, to be inserted together between the first and second plate members 10 and 20. The support plate 35 may contact at least one of the first and second plate members 10 and 20, thereby preventing deformation of the first and second plate members 10 and 20. In addition, based on the direction of extension of the bars 31, a total sectional area of the support plate 35 may be provided to be greater than that of the bars 31, so that heat transferred through the bars 31 may be diffused through the support plate 35.

The supporting unit 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 for reducing heat radiation between the first and second plate members 10 and 20 through the vacuum space 50 will now be described. The radiation resistance sheet 32 may be provided in the heat resistance unit. The heat resistance unit may be provided in the space that is in a vacuum state provided in or between in the plate members. The heat resistance unit may be constituted by all or a portion of members that prevent heat transfer between the first space and the second space.

The first and second plate members 10 and 20 may be made of a stainless material capable of preventing corrosion and providing sufficient strength. The stainless material may have a relatively high emissivity of 0.16, and hence a large amount of radiation heat may be transferred. In addition, the supporting unit 30 may be made of resin and have a lower emissivity than the plate members, and may not entirely cover or engage inner surfaces of the first and second plate members 10 and 20. Hence, the supporting unit 30 may not have good influence or effect on radiation heat. Therefore, the radiation resistance sheet 32 may be provided in a plate shape, over a majority of the area of the vacuum space 50, so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, since the transfer of radiation heat cannot be sufficiently blocked using one radiation resistance sheet, at least two radiation resistance sheets 32 may be provided at a certain or predetermined distance so as not to contact each other. Also, at least one radiation resistance sheet may be provided in a state in which it contacts the inner surface of the first or second plate member 10 or 20.

FIG. 10 is a table describing results obtained by examining resins used for manufacturing a supporting unit.

Referring to FIG. 10, the present inventor has examined various resins, and most of the resins may not be usable due to their outgassing rates and water absorption rates being high. Accordingly, the present inventor has examined resins that approximately satisfy conditions of desired outgassing rate and the water absorption rate. As a result, PE may be inappropriate to be used due to its high outgassing rate and its low compressive strength. PCTFE may not be preferable to be used due to its remarkably high price. PEEK may be inappropriate to be used due to its high outgassing rate.

Accordingly, it is seen that that a resin selected from a group including polycarbonate (PC), glass fiber PC, low outgassing PC, polyphenylene sulfide (PPS), and liquid crystal polymer (LCP) may be used as the material of the supporting unit. An outgassing rate of the PC is 0.19, which is a low level. Hence, as time required to perform baking, in which exhaustion is performed by applying heat, is increased to a certain level, the PC may be used as a material for the supporting unit.

The present inventor has found an optimal material by performing various studies on resins expected to be used inside the vacuum space. Hereinafter, results of the performed studies will be described with reference to the accompanying drawings.

Figure 11:
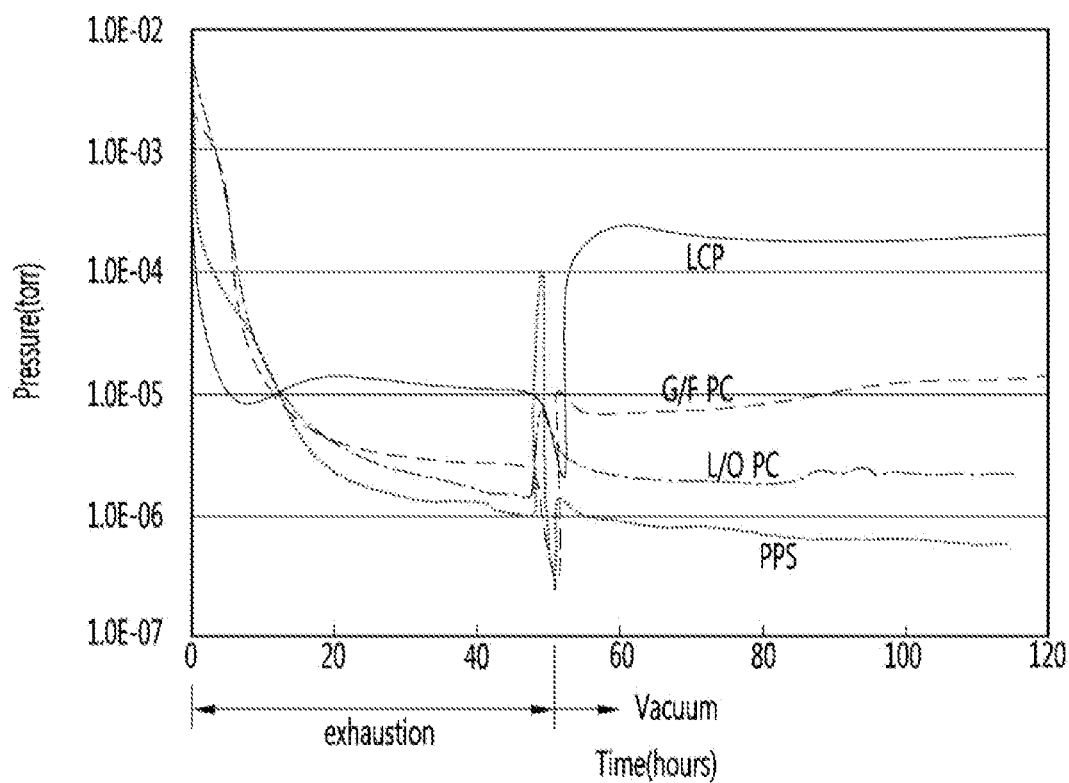
FIG. 11 is table illustrating results obtained by performing an experiment on vacuum maintenance performances of resins.

FIG. 11 is a view illustrating results obtained by performing an experiment on vacuum maintenance performances of the resins.

Referring to FIG. 11, there is illustrated a graph showing results obtained by fabricating the supporting unit using respective resins and then testing vacuum maintenance performances of the resins. First, a supporting unit fabricated using a selected material was cleaned using ethanol, left at a low pressure for 48 hours, exposed to the air for 2.5 hours, and then subjected to an exhaust process at 90° C. for about 50 hours. Such was performed in a state that the supporting unit was put in the vacuum insulator, thereby measuring a vacuum maintenance performance of the supporting unit.

It may be seen that in the case of the LCP, its initial exhaust performance is good, but its vacuum maintenance performance is bad. It may be expected that this is caused by sensitivity of the LCP to temperature. Also, it is expected through characteristics of the graph that, when a final allowable pressure is $5 \times 10^{-3}$ Torr, its vacuum performance will be maintained for a time of about 0.5 year. Therefore, the LCP may be deemed inappropriate as the material of the supporting unit.

It may be seen that, in the case of the glass fiber PC (G/F PC), its exhaust speed is fast, but its vacuum maintenance performance is low. It may be determined that this material will be influenced by an additive. Also, it is expected, through the characteristics of the graph, that the glass fiber PC will maintain its vacuum performance under the same condition for a time of about 8.2 years. Therefore, the LCP is inappropriate as the material of the supporting unit.

It is expected that, in the case of the low outgassing PC (O/G PC), its vacuum maintenance performance is excellent, and its vacuum performance will be maintained under the same condition for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is excellent, and its exhaust performance is also excellent. Therefore, it may be most preferably considered that, based on the vacuum maintenance performance, the PPS is used as the material of the supporting unit.

Figure 12:
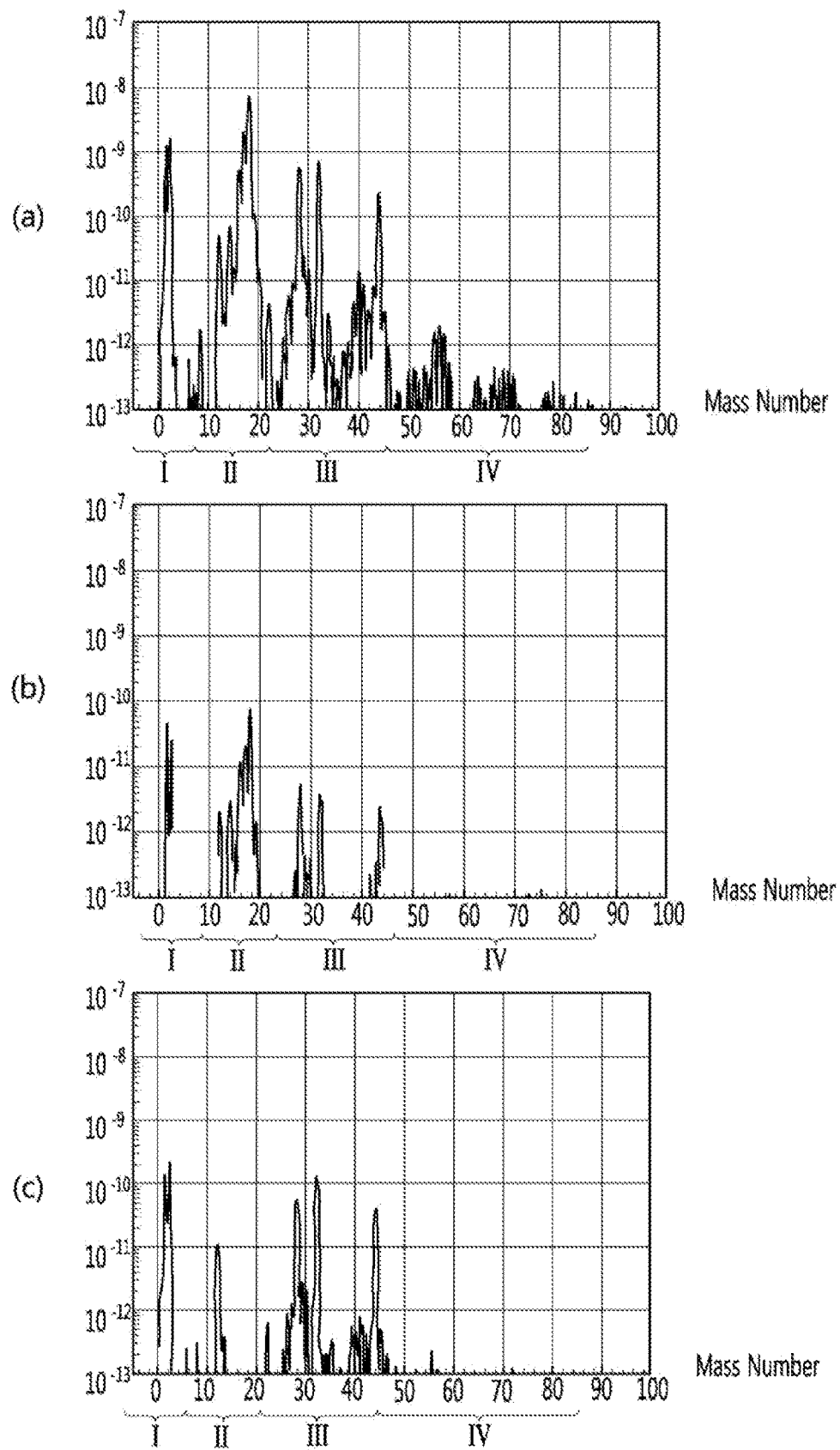
FIG. 12 is a graph illustrating results obtained by analyzing components of gases discharged from PPS and low outgassing PC.

FIG. 12 illustrates results obtained by analyzing components of gases discharged from the PPS and the low outgassing PC, in which the horizontal axis represents mass numbers of gases and the vertical axis represents concentrations of gases. FIG. 12 illustrates a result obtained by analyzing a gas discharged from the low outgassing PC. In FIG. 12, it may be seen that H2 series (I), H2O series (II), N2/CO/CO2/O2 series (III), and hydrocarbon series (IV) are equally discharged. FIG. 12 illustrates a result obtained by analyzing a gas discharged from the PPS. In FIG. 12, it may be seen that H2 series (I), H2O series (II), and N2/CO/CO2/O2 series (III) are discharged to a weak extent. FIG. 12 shows a result obtained by analyzing a gas discharged from stainless steel. In FIG. 12, it may be seen that a similar gas to the PPS is discharged from the stainless steel. Consequently, it may be seen that the PPS discharges a similar gas to the stainless steel.

Based on the analyzed result, it may be re-confirmed that the PPS is excellent as the material of the supporting unit.

Figure 13:
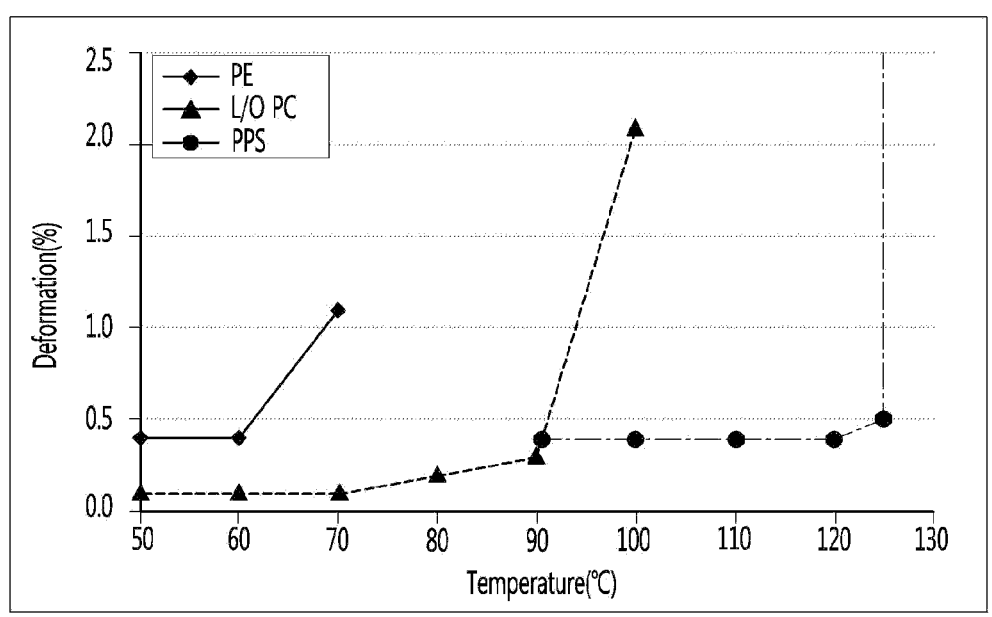
FIG. 13 is a graph illustrating results obtained by a maximum deformation temperature at which the resins are damaged by atmospheric pressure in high-temperature exhaustion.

FIG. 13 illustrates results obtained by measuring maximum deformation temperatures at which resins are damaged by atmospheric pressure in high-temperature exhaustion. Illustratively, the bars 31 were provided with a diameter of 2 mm at a distance less than 30 mm. Referring to FIG. 13, it may be seen that rupture occurs at 60° C. in the case of the PE, a rupture occurs at 90° C. in the case of the low outgassing PC, and a rupture occurs at 125° C. in the case of the PPS.

Based on the analyzed result, it may be seen that the PPS is most preferably used as the resin inside the vacuum space. However, the low outgassing PC may be used in terms of fabrication cost.

FIG. 14 is a view illustrating an embodiment of conductive resistance sheets and peripheral parts thereof. Structures of the conductive resistance sheets are illustrated in FIG. 6, but will be described in detail with reference to FIG. 14.

First, a conductive resistance sheet shown in FIG. 14A may be preferably applied to the vacuum insulation provided in the main body 3. Specifically, the first and second plate members 10 and 20 may be sealed so as to vacuumize the interior of the vacuum insulator. In this case, since the two plate members have different temperatures from each other, heat transfer may occur between the two plate members. A conductive resistance sheet 60 may be provided to prevent heat conduction between such two different plate members.

The conductive resistance sheet 60 may be provided with sealing parts 61 at which both ends of the conductive resistance sheet 60 are sealed to define at least one portion of the wall for the third space and maintain a vacuum state. The conductive resistance sheet 60 may be provided as a thin foil in a range of micrometers so as to reduce the amount of heat conducted along the wall of the third space. The sealing parts 61 may be provided as welded parts or areas. That is, the conductive resistance sheet 60 and the plate members 10 and 20 may be fused to each other. In order to cause or enhance a fusing action between the conductive resistance sheet 60 and the plate members 10 and 20, the conductive resistance sheet 60 and the plate members 10 and 20 may be made of the same material. Stainless material may be used as the material. The sealing parts 61 are not limited to the welding parts, and may be provided through a process such as cocking. The conductive resistance sheet 60 may be provided in a curved shape. Thus, a heat conduction distance or length of the conductive resistance sheet 60 is provided longer than the linear distance between plate members, so that the amount of heat conduction may be further reduced.

A change in temperature may occur along the conductive resistance sheet 60. Therefore, in order to block heat transfer to the exterior of the conductive resistance sheet 60, a shielding part 62 may be provided at the exterior of the conductive resistance sheet 60 such that an adiabatic situation occurs. In other words, in the storehouse, the second plate member 20 may have a high temperature and the first plate member 10 may have a low temperature. In addition, heat conduction from high temperature to low temperature may occur in the conductive resistance sheet 60, and hence the temperature of the conductive resistance sheet 60 is suddenly changed. Therefore, if the conductive resistance sheet 60 is opened or exposed to the exterior, heat transfer through the exposed portion may be substantial. In order to reduce heat loss, a shielding part 62 is provided at or about the exterior of the conductive resistance sheet 60. For example, when the conductive resistance sheet 60 is exposed to any one of a low-temperature space and a high-temperature space, the conductive resistance sheet 60 does not serve as well as a conductive resistor if exposed, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion corresponding to the vacuum insulator used in the main body 3 when the door 1 is closed.

A conductive resistance sheet as shown in FIG. 14B may be preferably applied to the vacuum insulator provided in the door 1. In FIG. 14B, portions different from those of FIG. 14A are described in detail, and the same description may be applied to portions identical to those of FIG. 14A. A side frame 70 may be provided at an outside of the conductive resistance sheet 60. A part for sealing between the door and the main body, an exhaust port necessary for an exhaust process, a getter port for vacuum maintenance, and the like may be placed on the side frame 70. Such arrangement is provided in that mounting positions of parts may be convenient in the case of the main body, but mounting positions of parts may be limited in the case of the door.

In the vacuum insulator used in the door 1, it may be difficult to place the conductive resistance sheet 60 at a front end portion of the vacuum space, i.e., a corner side portion of the vacuum space. This is because, unlike the main body, a corner edge portion of the door is exposed to the exterior. More specifically, if the conductive resistance sheet 60 is placed at the front end portion of the vacuum space, the corner edge portion of the door is exposed to the exterior. Hence there is a disadvantage in that a separate adiabatic part should be provided so as to insulate the conductive resistance sheet 60.

Figure 15:
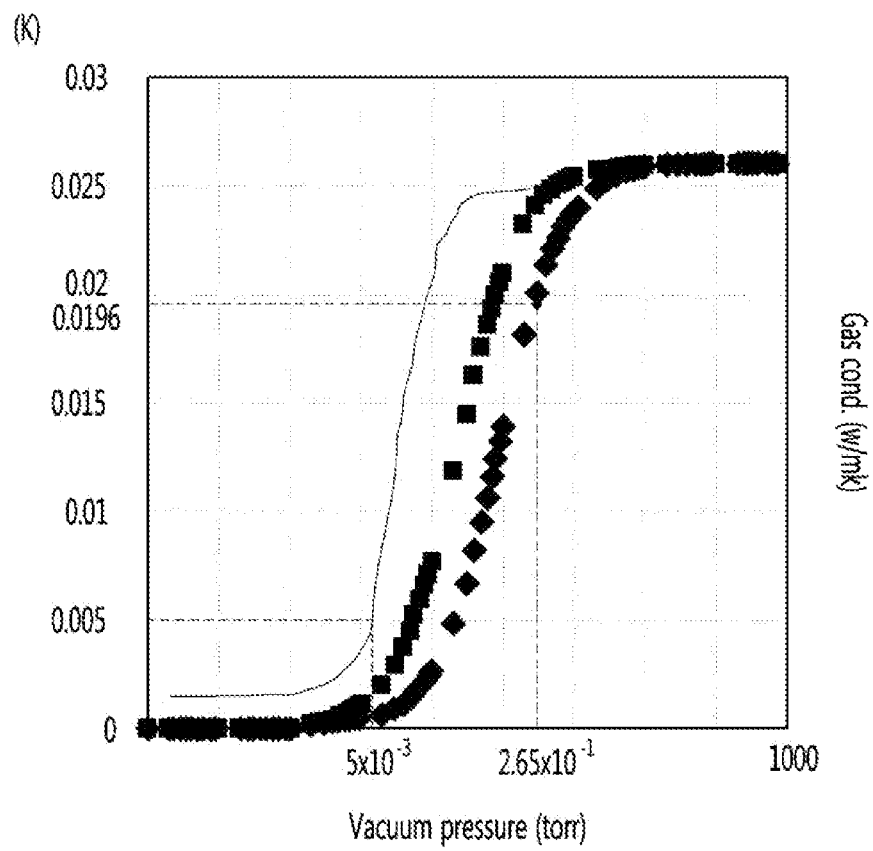
FIG. 15 is a graph illustrating results obtained by comparing a vacuum pressure with gas conductivity.

FIG. 15 is a graph obtained by comparing a vacuum pressure with gas conductivity.

Referring to FIG. 15, gas conductivities with respect to vacuum pressures depending on sizes of gap in the vacuum space 50 are represented as graphs of effective heat transfer coefficients (eK). Effective heat transfer coefficients (eK) were measured when the gap in the vacuum space 50 has three sizes of 2.76 mm, 6.5 mm, and 12.5 mm. The gap in the vacuum space 50 is defined as follows. When the radiation resistance sheet 32 exists inside vacuum space 50, the gap is a distance between the radiation resistance sheet 32 and the plate member adjacent thereto. When the radiation resistance sheet 32 does not exist inside vacuum space 50, the gap is a distance between the first and second plate members.

It was seen that, since the size of the gap is small at a point corresponding to a substantial heat transfer coefficient of 0.0196 W/mK (of a storehouse according to the related art), where an adiabatic material (formed by foaming polyurethane) is provided, the vacuum pressure was $2.65 \times 10^{-1}$ Torr even when the size of the gap is 2.76 mm. Meanwhile, the point at which reduction in adiabatic effect caused by gas conduction heat is saturated, even though the vacuum pressure is decreased, is a point at which the vacuum pressure is approximately $5 \times 10^{-4}$ Torr. Also, when greater than $5 \times 10^{-3}$ Torr is applied, the heat insulating effect is sharply reduced. Under these conditions, the vacuum pressure of $5 \times 10^{-3}$ Torr may be defined as the point at which reduction in adiabatic effect caused by gas conduction heat is saturated. Thus, in order to provide optimal heat insulating performance having no radiation heat transfer, the vacuum pressure of the vacuum space may be maintained to $5 \times 10^{-3}$ Torr or less.

As described above, pressure within the vacuum space 50 may be maintained in a substantial vacuum state, in which a gas is very lean, to reduce radiation heat transfer. Thus, a considerable amount of pressure may be applied between the plate members 10 and 20, and contracting force applied in a direction in which the distance between the plate members 10 and 20 is reduced. The contracting force has been previously described in the situation in which the contracting force is applied to both surfaces of the thermoelectric module 40.

Figure 16:
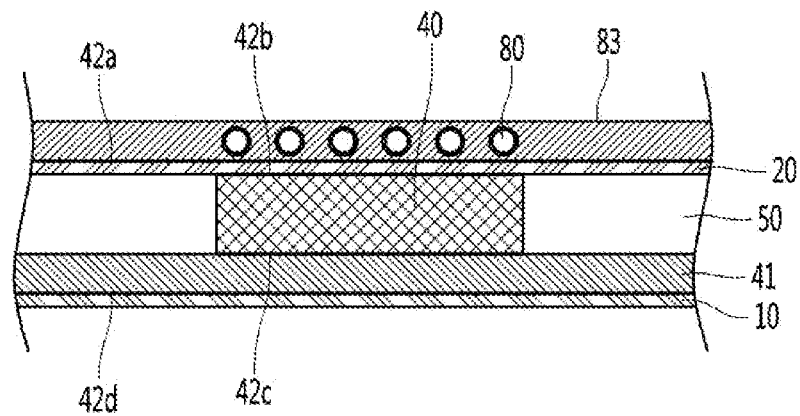
FIG. 16 is a cross-sectional view of the storehouse in which a thermoelectric module is provided.

FIG. 16 is a cross-sectional view of storehouse in which a thermoelectric module is provided. A heat transfer path passing through the thermoelectric module will be described with reference to FIG. 16.

Referring to FIG. 16, the heat diffusion block 41 is provided on the outer surface of the first plate member 10. The thermoelectric module 40 is provided at an approximately central point on the outer surface of the heat diffusion block 41. The inner surface of the second plate member 20 comes into contact with the outer surface of the thermoelectric module 40. The heatsink 83 is provided on the outer surface of the second plate member 20.

As described above, the vacuum space 50 may be in a vacuum state that is close to almost zero. Thus, a large contracting force may be applied or present between the plate members. The heat diffusion block 41 and the second plate member 20, which come into contact with the inner and outer surfaces of the thermoelectric module 40, may perform heat transfer through conduction. When the contact interfaces are spaced apart from each other to generate a gap, thermal conduction is not performed. Since the gap is provided in the vacuum space 50, convection action through the gap is not generated. Only heat transfer by the radiation occurs. It may be expected that the heat transfer by radiation will be extremely small. Thus, it may be important that the contact interface provides perfect or good contact.

The contracting force between the plate members 10 and 20 due to the vacuum pressure, of the vacuum space 50, may promote surface contact between the thermoelectric module 40 and the heat diffusion block 41 and surface contact between the thermoelectric module 40 and the second plate member 20 to improve heat conduction. In addition, the thermal interface modules 42b, 42c, and 43d may be intervened into the contact surface between the thermoelectric module 40 and the heat diffusion block 41, the contact surface between the thermoelectric module 40 and the second plate member 20, and the contact surface between the thermoelectric block 41 and the first plate member 10 so as to improve heat conduction.

In this embodiment, the thermal interface may be made of a metal material such as indium or lead. Thus, an effect of the outgassing may be minimized in the vacuum space 50.

Alternatively, the thermal interface module 42a used on the contact surface between the heatsink 83 and the second plate member 20 may use heat grease or thermal grease. This is done because the contact surface is outside the vacuum space 50, and thus, there is no influence of the outgassing.

Figure 17:
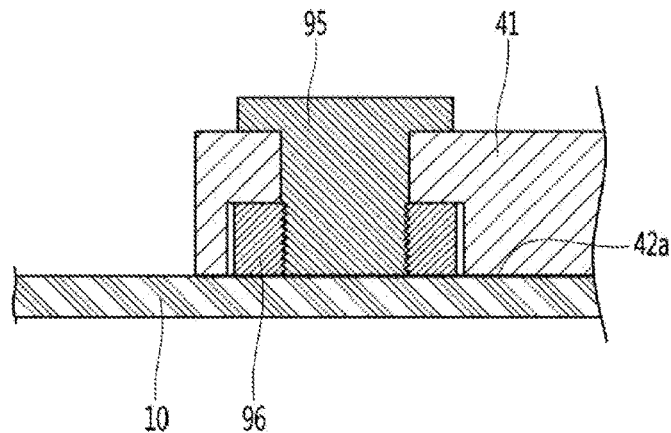
FIG. 17 is a view describing coupling of a heat diffusion block and a first plate member.

FIG. 17 is a view describing the coupling of the heat diffusion block and the first plate member.

As described above, quality of contact surface or contact between the members is one factor that determines heat conduction performance. Thus, it may be preferable that the coupling between the heat diffusion block 41 and the first plate member 10 is performed using a bolt and nut to provide a strong coupling force.

Referring to FIG. 17, the nut 96 is coupled to the first plate member 10 through a method such as welding. A hole having a head opening may be provided in the heat diffusion block 41, and the nut 96 is provided in the head opening. Thereafter, the bolt 95 is coupled to pass through the hole and the nut 96. The bolt 95 and the nut 96 may be provided at about 4 to 6 positions, for example, on the entire heat diffusion block 41. The thermal interface module 42a, made of a metal material, may be inserted into the contact surface between the heat diffusion block 41 and the first plate member 10.

Figure 18:
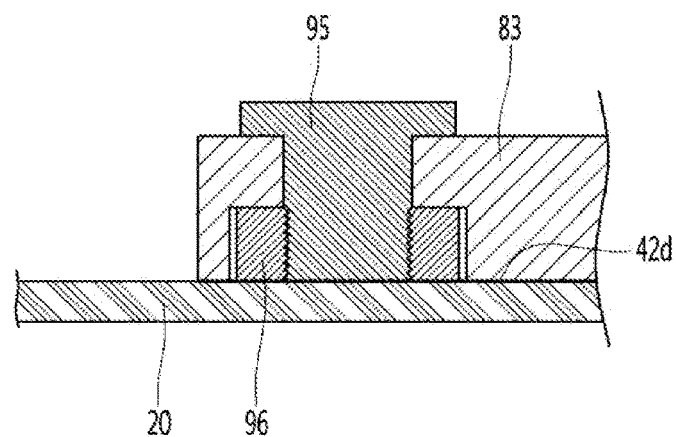
FIG. 18 is a view describing coupling of a second plate member and a heatsink.

FIG. 18 is a view showing the coupling of the second plate member and the heatsink.

As described above, quality of contact surface or contact between members determines the heat conduction performance. Thus, it may be preferable that the coupling between the heatsink 83 and the second plate member 20 is performed using a bolt and nut to provide strong coupling force.

Referring to FIG. 18, the nut 96 is coupled to the second plate member 20 through a method such as welding. A hole having a head opening may be provided in the heatsink 83, and nut 96 provided in the head opening. Thereafter, bolt 95 is provided to pass through the hole and the nut 96. The bolt 95 and the nut 96 may be provided at about 6 to 10 positions, for example, on the entire heatsink 83. A liquid thermal interface module using heat grease may be inserted into the contact surface between the heatsink 83 and the second plate member 20.

Figure 19:
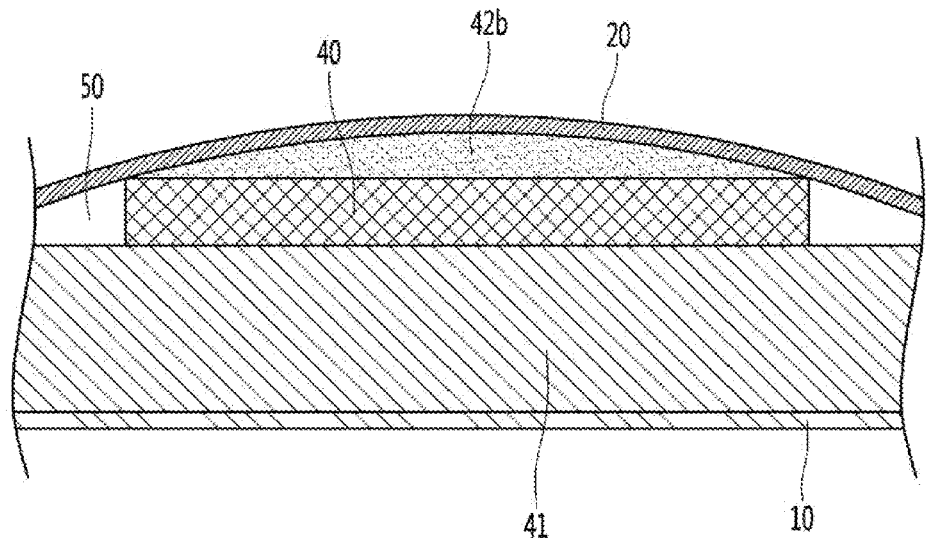
FIG. 19 is an enlarged view of a contact surface between the heat diffusion block and the second plate member.

FIG. 19 is an enlarged view of the contact surface between the heat diffusion block and the second plate member.

Referring to FIG. 19, the second plate member 20 is provided as a thin plate, and the thermoelectric module 40 is made of ceramic. When contracting force due to the vacuum space 50 is applied to the second plate member 20, the second plate member 20 may come into line contact or contact at an edge portion of the thermoelectric module 40, and the second plate and the thermoelectric module 40 may be spaced apart from each other at a central portion of the thermoelectric module 40. Thus, the distance between the bars 31, provided on the supporting unit 35, may be adjusted to implement various structures. That is to say, when the distance between the edge portion and the bar increases, the spaced distance may increase. As a result, the heat conduction performance may deteriorate.

To solve this problem, the thermal interface module 42B may be made of indium or lead. The indium has a melting point of 156 degrees, i.e., a low melting point. Thus, after a set vacuum value is applied to the vacuum space 50, the thermal interface module 42, made of the indium, may be heated to fill the thermal interface module 42b in the spaced portion between the second plate and the thermoelectric module 40 (at the central portion of the thermoelectric module 40). As a result, deterioration in heat conduction performance may be prevented.

Although lead has a melting point of 327 degrees, lead has a soft property. Thus, when a set vacuum value, of the vacuum space 50, is applied to cause deformation of the second plate member 20, a thermal interface module 42 made of lead may be filled into the spaced portion or volume between the second plate and the thermoelectric module 40 (at the central portion of the thermoelectric module 40). With this arrangement, deterioration in heat conduction performance may also be prevented.

The same structure may also be applied to the contact surface between the heat diffusion block 41 and the thermoelectric module 40 to obtain improved heat conduction performance with respect to the contact surface.

An arrangement for applying power to the thermoelectric module will be described with reference to FIGS. 20 and 21.

Figure 20:
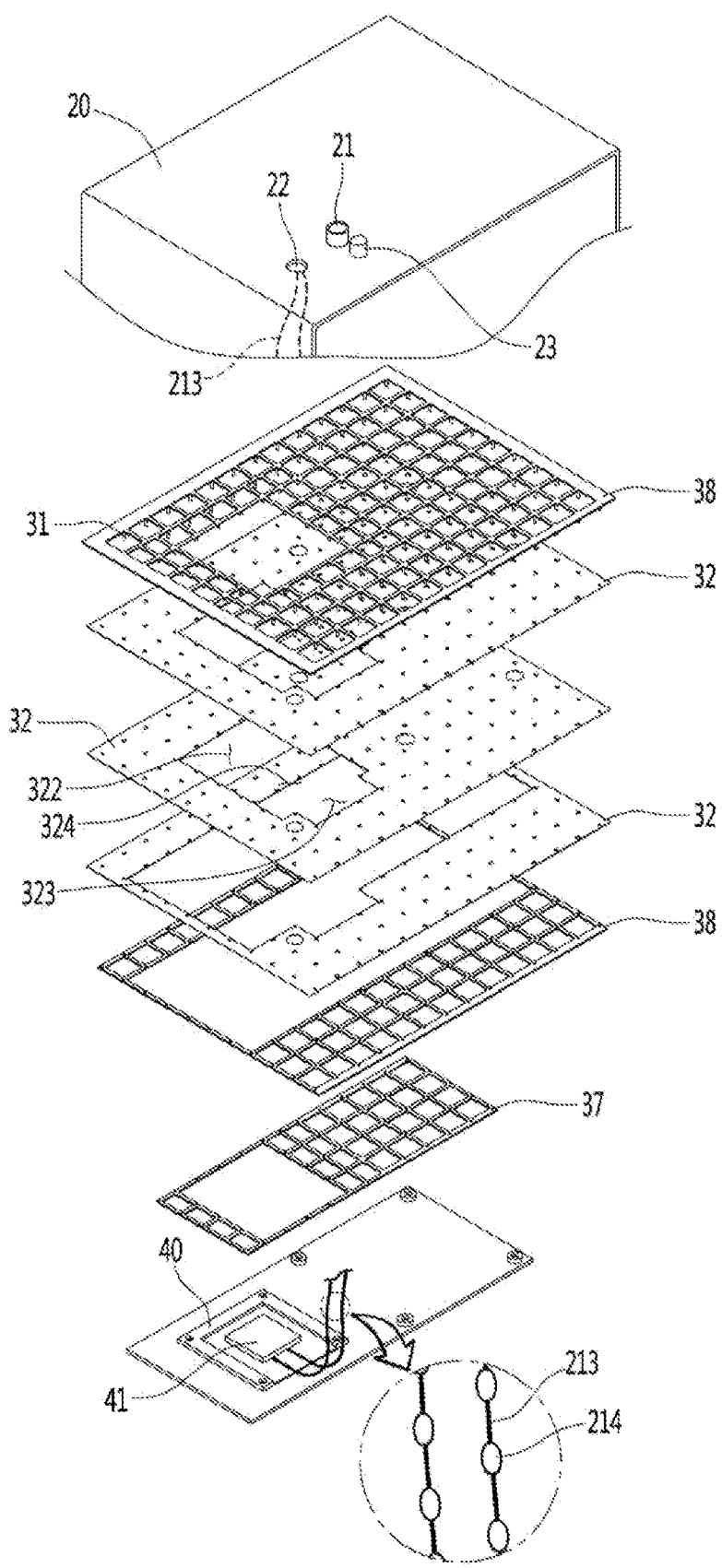
FIG. 20 is an exploded perspective view illustrating a peripheral portion of the thermoelectric module.

FIG. 20 is an exploded perspective view illustrating a peripheral portion of the thermoelectric module.

Referring to FIG. 20, at least two or more radiation resistance sheets 32 are inserted into the support plates 35 at a predetermined interval, as provided on the supporting unit 30. The radiation resistance sheets 32 may be supported at predetermined intervals by bars 31 that connect the support plates 35 to each other. Spaces may be provided between the radiation resistance sheets 32. Although not shown, the spacers may be provided between the radiation resistance sheets to prevent the radiation resistance sheets from coming into contact with each other.

The supporting unit 30 may not be provided on the place or location on which the thermoelectric module 40 is provided. The thermoelectric module 40 and the heat diffusion block 41 may come into direct contact with the plate members 10 and 20.

In order to apply power to the thermoelectric module 40, a pair of wires may extend from the power source hole 22 to the thermoelectric module 40. The pair of wires 213 may be provided in a stripped state, as much as possible, in order to reduce outgassing.

A protrusion sheath 214 made of a resin material (to prevent the pair of wires 213 from being short-circuited with each other when being bent and to prevent components within the vacuum space from coming into contact with each other) may be provided on each of the pair of wires 213. Adjacent components, for example, the pair of wires, may be provided at predetermined interval with protrusion sheaths 214. A portion on which the protrusion sheath 214 may not be provided, i.e., a portion made only of conducting wire made of, for example a copper material, may be bent to provide a predetermined bending part or portion.

The protrusion sheath 214 may be made of a material having low outgassing such as the same material forming the supporting unit 30. For example, polycarbonate (PC), glass fiber PC, low outgassing PC, polyphenylene sulfide (PPS), and liquid crystal polymer (LCP) may be used as a material for the protrusion sheath. More preferably, the PPS, such as the material forming the supporting unit, may be used. When the sheath is generally made of a material having low outgassing such as polycarbonate (PC), glass fiber PC, low outgassing PC, polyphenylene sulfide (PPS), and liquid crystal polymer (LCP), the sheath may be provided to entirely cover the wire. However, with a general wire sheath made of a plastic chloride resin, a sheath of the wire may be in the form of the described protrusion sheath, without covering the entire conducting wire.

In order to prevent the wire 213 from being short-circuit on the path through which the wire 213 passes, a predetermined area, of the radiation resistance sheets 32, may be cut out or omitted. Particularly, the radiation resistance sheet 32 may be cut out around the path through which the wire 213 passes so as to provide a wire guide portion or opening 324. The wire guide portion of opening 324 may be cut together with a thermoelectric module seating portion or opening 322 on or into which the thermoelectric module 40 is placed.

In order to form vacuum in the vacuum space 50, exhaust may be performed through the exhaust port 21. A strong flow rate may be generated in the exhaust port 21 at the beginning of an air discharge process. In order to prevent radiation resistance sheets 32 from being deformed and coming into contact with each other by the strong flow rate, a position or location of radiation resistance sheet 32 corresponding to the exhaust port 21 may be cut out or omitted to provide an exhaust port seating portion or opening 323. The exhaust port seating portion or opening 323 may be cut together with the wire guide portion or opening 324.

Figure 21:
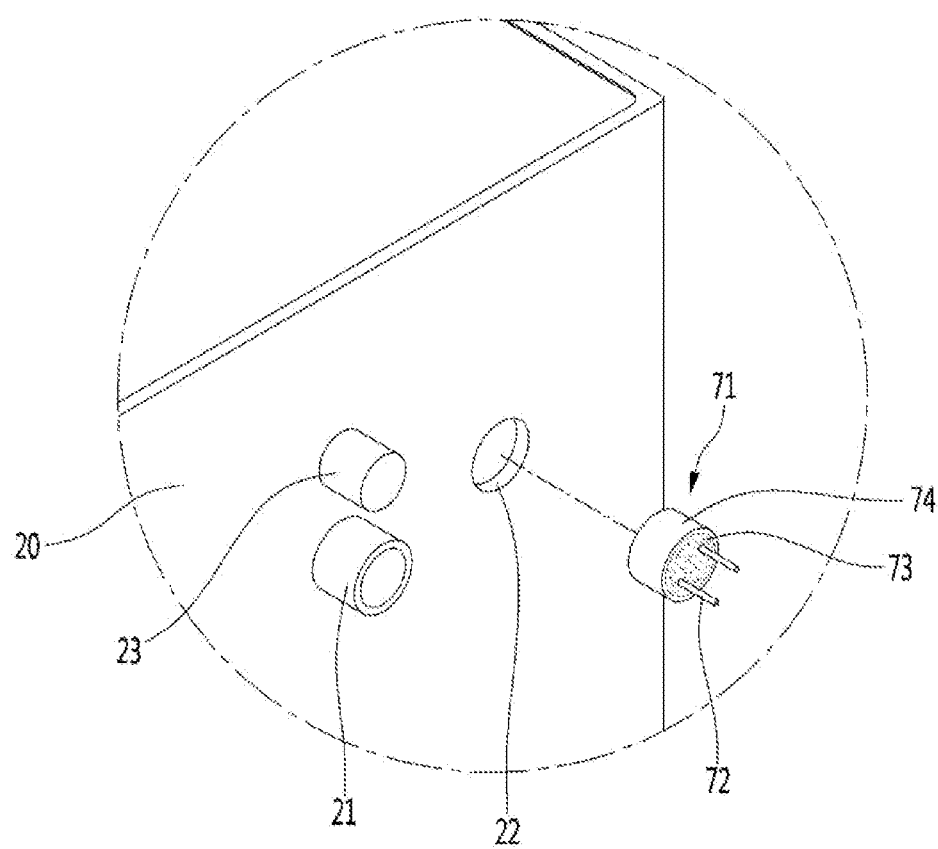
FIG. 21 is a view describing operation of a sealing terminal that blocks a power source hole.

FIG. 21 is a view for describing an operation of a sealing terminal that blocks the power source hole.

Referring to FIG. 21, a sealing frame 74 having, for example, a cylindrical shape may be provided on the sealing terminal 71. The sealing frame 74 may have a shape that is similar to that of the power source hole 22. Two power terminals 72 may pass through a center of the sealing frame 74. A gap between the power terminal 72 and the sealing frame 74 may be sealed with an encapsulating member 73. The encapsulating member 73 may be made of a glass material.

The power terminal 72 may be inserted into the power source hole 22, and thus, one end of the power terminal 72 may be connected to the wire 213. The other end of the power terminal 72 may be connected to an external power source. The sealing frame 74 may cover the power source hole 22. The sealing frame 74 may be welded with the second plate member 20, thereby sealing the gap between the members.

Figure 22:
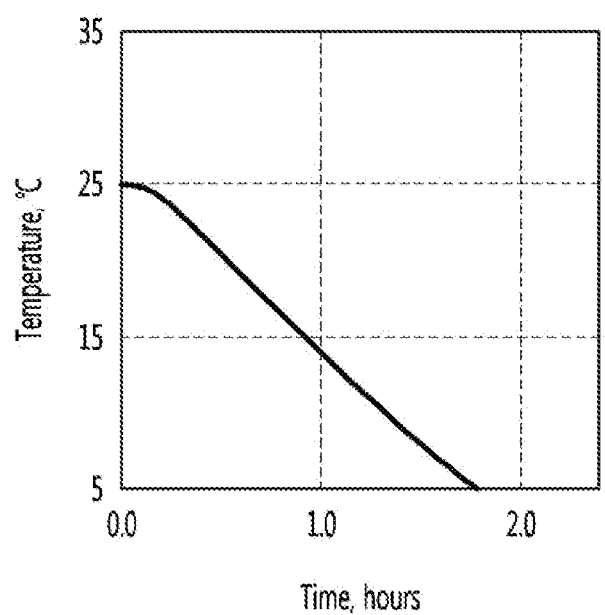
FIG. 22 is a graph illustrating results obtained through experiment on cooling performance of the storehouse according to an embodiment.

FIG. 22 is a graph illustrating experimental results of a storehouse according to an embodiment.

Referring to FIG. 22, the vacuum space 50 has a distance of 10 mm, the storehouse has an internal capacity of 11 liters, a thermoelectric module N49 of LG Innotek is used as the thermoelectric module 40, 50 W of power is applied, and 500 cc of beverage is provided inside the storehouse.

The above-described configuration may be provided to measure a time taken to decrease temperature from 25 degrees to 15 degrees. As a result, cooling took 0.9 hours. In addition, subsequent to such cooling, it was confirmed that the temperature dropped below zero to reach a temperature of minus 19° C.

In the above embodiment, a scenario in which the storehouse is used as a refrigerator has been mainly described. However, it is appreciated that a direction of the current supplied to the thermoelectric module 40 may be switched, so that the storehouse 200 may be used as a warm cabinet.

According to the present disclosure, a storehouse may be provided with a vacuum insulator by using a thermoelectric module. Further, a storehouse adequate for a vehicle may be provided. Therefore, the consumer's needs may be further improved, and industrial application is highly expected.

An object of the present disclosure is to provide a vacuum insulator that improves thermal transfer performance of a thermoelectric module in a storehouse, a vehicle storehouse, and a vehicle.

An object of the present disclosure is to provide a vacuum insulator that is capable of obtaining sufficient heat insulating performance in a storehouse, a vehicle storehouse, and a vehicle.

An object of the present disclosure is to provide a vacuum insulator that is capable of stably maintaining high heat insulating performance for an extended time in a storehouse, a vehicle storehouse, and a vehicle.

An object of the present disclosure is to provide a vacuum insulator that is capable of stably providing a storehouse, by using vacuum, even though vibration occurs in a storehouse, a vehicle storehouse, and a vehicle.

According to the disclosure, in order to obtain high heat transfer between the inside and the outside of a space, a heat transfer block and a thermoelectric module may be provided in surface contact with each other. The heat transfer block and the thermoelectric module may be provided in surface contact with each other in a vacuum space. In order to improve heat transfer performance, a heatsink may be provided outside the heat insulating space.

In order to obtain high heat insulating performance, the heat insulating space may be formed into a high vacuum space. A supporting unit or structure, for preventing a heat insulating wall from being contracted, or collapse, may be inserted into the heat insulating space.

In order to stably provide heat insulating performance for an extended time, a nut may be coupled to one surface of a plate member or plate, and a component (such as a heat diffusion block) may be attached by a bolt coupled to the nut.

In order to improve heat transfer performance within the high vacuum space, a thermal interface module may be intervened into a contact surface or area between the thermoelectric module and the heat diffusion block. In order to further improve heat transfer performance, the thermal interface module may be made of a metal material, and the metal may include indium or lead.

A problem, such as a short circuit when power is introduced into the heat insulating space may be prevented from occurring even though an impact is applied from the outside. A wire guide opening may be provided, by cutting a component, so that the component provided in the heat insulating space does not come into contact with an electric wire.

In order to prevent a problem such as a short circuit occurring, resulting from air flow during production of the product, a portion or opening in which the thermoelectric module is placed and a portion or opening in which an exhaust port is placed may be integrally provided to prevent power from leaking and to allow a storehouse to stably operate.

In order to prevent vacuum damage from occurring due to outgassing of a conducting wire introduced into the high vacuum space, and to enable the conducting wire to be bent, only a portion of the conducting wire may be covered.

According to the present disclosure, an improvement in heat insulating effect provided by a high degree of vacuum may be obtained. Also, surface contact between components placed in the vacuum space part or vacuum space may be improved. Thus, thermal conductivity may be improved so as to improve the heat transfer performance of the thermoelectric module.

According to the present disclosure, the thermoelectric module may be provided in the vacuum space without performing a separate coupling operation, such as a bolt coupling in the vacuum of the vacuum space.

According to the present disclosure, a heat diffusion module and a heatsink may be respectively coupled to not only plates but may be coupled to a single body passing through the vacuum space. Such provides reliable coupling without deteriorating thermal conductivity.

According to the present disclosure, a thermal interface module constructed of metal material having a low outgassing property may be intervened into the contact surface or area between components placed in the vacuum space part. A thermal interface module may be intervened into a contact surface or area between components placed outside the vacuum space to further improve heat conduction performance.

According to the present disclosure, in order to supply power to a thermoelectric module placed in the vacuum space, an electric wire, provided in the vacuum space, may be provided to be partially peeled off or exposed to reduce outgassing. In order to prevent electric wires from being short-circuited with each other, the sheath of the electric wire may be provided with protrusion sheaths that are spaced apart from each other. Such prevents the electric wires from being short-circuited with each other or prevents the electric wire from being short-circuited with an external component.

According to the present disclosure, a thermal interface module made of the metal material may be inserted between the thermoelectric module and a plate to prevent deterioration of heat conduction performance, even though the plate member is deformed by high vacuum pressure.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An insulated storage comprising:
a first plate to have a first temperature;
a second plate to have a second temperature that is different from the first temperature;
a vacuum space provided between the first plate and the second plate to have a temperature between the first temperature and the second temperature;
a sealing part configured to seal the first plate and the second plate;
a thermoelectric module provided in the vacuum space, and the thermoelectric module having a first temperature part and a second temperature part; and
a heat diffusion block having a third surface and a fourth surface,
wherein the heat diffusion block and the thermoelectric module are configured to perform heat transfer between the third surface of the heat diffusion block and the first temperature part of the thermoelectric module.

2. The insulated storage according to claim 1, wherein the first temperature part of the thermoelectric module is to face the third surface of the heat diffusion block.

3. The insulated storage according to claim 2, comprising a thermal interface module between the first temperature part of the thermoelectric module and the third surface of the heat diffusion block.

4. The insulated storage according to claim 1, wherein the fourth surface of the heat diffusion block is to face the first plate, and the heat diffusion block and the first plate are configured to perform heat transfer between the first plate and the fourth surface of the heat diffusion block.

5. The insulated storage according to claim 4, comprising a thermal interface module between the fourth surface of the heat diffusion block and the first plate.

6. The insulated storage according to claim 1, wherein the second temperature part of the thermoelectric module is to face the second plate, and the thermoelectric module and the second plate are configured to perform heat transfer between the second temperature part of the thermoelectric module and the second plate.

7. The insulated storage according to claim 6, comprising a thermal interface module between the second temperature part of the thermoelectric module and the second plate.

8. The insulated storage according to claim 1, comprising:
a heat sink having a fifth surface and a sixth surface,
wherein heat transfer is to occur between the second temperature part of the thermoelectric module and the fifth surface of the heat sink.

9. An insulated storage comprising:
a first plate to have a first temperature;
a second plate to have a second temperature that is different from the first temperature;
a vacuum space provided between the first plate and the second plate to have a temperature between the first temperature and the second temperature;
a sealing part configured to seal the first plate and the second plate;
a thermoelectric module provided in the vacuum space, and the thermoelectric module to have a first temperature part and a second temperature part;
a heat diffusion block provided in the vacuum space between the thermoelectric module and the first plate; and
a first thermal interface module is provided between the first temperature part of the thermoelectric module and the heat diffusion block.

10. The insulated storage according to claim 9, wherein a second thermal interface module is provided between the second temperature part of the thermoelectric module and the second plate.

11. The insulated storage according to claim 10, wherein a third thermal interface module is provided between the heat diffusion block and the first plate.

12. An insulated storage comprising:
a first plate to have a first temperature;
a second plate to have a second temperature that is different from the first temperature;
a vacuum space provided between the first plate and the second plate to have a temperature between the first temperature and the second temperature;
a sealing part configured to seal the first plate and the second plate;
a thermoelectric module provided in the vacuum space, and the thermoelectric module having a first temperature part and a second temperature part; and
a wire to apply power to the thermoelectric module.

13. The insulated storage according to claim 12, comprising:
a power source hole on the first plate or the second plate; and
a sealing terminal configured to block the power source hole.

14. The insulated storage according to claim 12, wherein the wire comprises:
an inner conducting wire; and
a sheath to cover at least a portion of the inner conducting wire.

15. The insulated storage according to claim 14, wherein the sheath includes protrusion sheaths spaced apart from each other to cover a portion of the inner conducting wire.

16. The insulated storage according to claim 12, comprising:
a supporting structure configured to maintain the vacuum space;
wherein the supporting structure includes a wire guide opening to provide an opening for the wire to pass.

17. The insulated storage according to claim 16, the supporting structure including at least two bars, wherein the wire guide opening is provided between one of the at least two bars and the other one of the at least two bars.

18. The insulated storage according to claim 16, wherein the wire guide opening is integrated with a thermoelectric seating opening corresponding to a position of the thermoelectric module and an exhaust port seating opening corresponding to a position of an exhaust port.

19. The insulated storage according to claim 12, comprising:
   a heat resistance unit configured to reduce heat transfer between the first plate and the second plate,
   wherein the heat resistance unit includes a wire guide opening to provide an opening for the wire to pass.

20. The insulated storage according to claim 19, wherein the heat resistance unit includes a radiation resistance sheet,
   wherein the radiation resistance sheet includes the wire guide opening.

* * * * *